June 28, 1927.

P. HALLOT 1,634,186

BRAKING OF MOTOR AND OTHER VEHICLES

Original Filed April 6, 1921

INVENTOR

PAUL HALLOT

BY

ATTORNEYS

Patented June 28, 1927.

1,634,186

UNITED STATES PATENT OFFICE.

PAUL HALLOT, OF PARIS, FRANCE.

BRAKING OF MOTOR AND OTHER VEHICLES.

Original application filed April 6, 1921, Serial No. 459,140, and in France December 6, 1913. Divided and this application filed February 23, 1923. Serial No. 620,763.

This invention relates to the powerful braking of motor cars and other vehicles, by means, namely of braking devices in which the member which operates the said braking is pressed against a clutching drum solid with the wheels in their rotating movement, or with the axles which control the said member by means of a force which is taken from the vehicle itself.

The object of the invention is to increase the braking efficiency: to give the braking action its maximum intensity at high speed: to prevent wedging of the wheels at the required speed; and to vary the braking action according to the type of wheel to be braked. The application is a divisional application of my application Serial #459,140, filed April 6, 1921.

In the accompanying drawings which show of course only the most simple embodiments of the invention.

Figure 1:
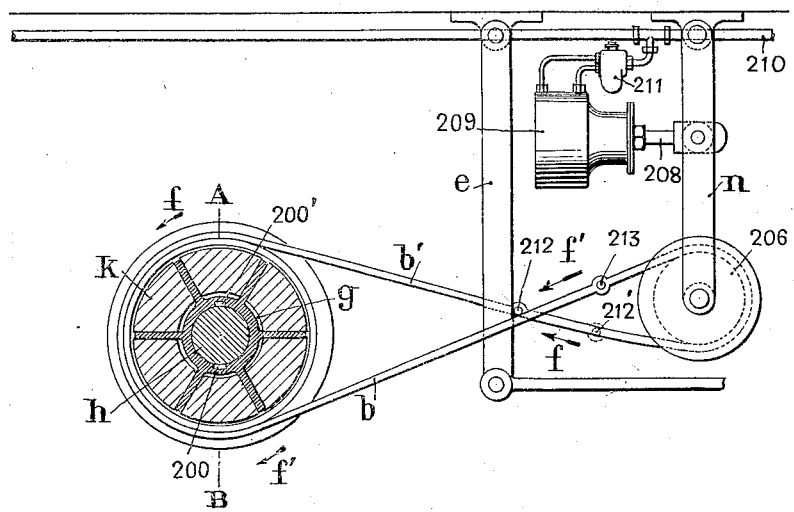
Fig. 1 shows a diagrammatic arrangement which uses the arrangement of Fig. 2 for braking a vehicle, while using for the said braking any fluid under pressure, or compressed air, or even the vacuum or any uncongealing liquid.
Figure 2:
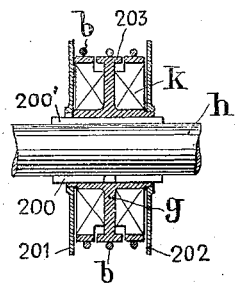
Fig. 2 is a diagrammatic cross section showing the arrangement of a controlling drum brake in three parts one of which only being solid with the driving shaft.

The controlling member which, as in Fig. 2 is shown only by way of example, is constituted by a band or cable $b$ which passes over a drum formed with two loose pulleys 201, 202 and with a fixed pulley 203 which separates the loose pulleys and is integral with the drum $g$ keyed at 200 on the shaft $h$, the latter being, for instance a wheel axle. The loose pulleys 201, 202 may be rendered solid with the drum $g$ by means of centrifugal masses $k$ (Figs. 1 and 2) carried around in the movement of rotation of the shaft $h$ by radial partitions solid with the drum.

The forces of dragging along or of radial friction which the said masses are developing by centrifugal force against the internal side of the rings 201 and 202 cause complementary braking effects to be obtained, which latter decrease according to the speed, but which, should the wedging of the wheels occur, are removed, leaving only in action the reduced force, unable to produce the wedging of the wheels, which is acting upon the fixed drum $g$ by means of the part connected with the pedal or any other controlling member which may be a fluid operated member.

The controlling member of braking which is formed by the cable $b$ in the example shown in Fig. 1, passes over a roller 206 carried on a rocking arm $n$ pivoted at the end of the rod 208 of a brake piston working in a cylinder 209 into which compressed air may be fed by means of a pipe 210 under the control of an automatic valve 211. Studs 212 and 213 carried by the cable $b$ may, according to the direction of travel, act upon a lever $e$ which controls in any known manner the usual braking of a carriage.

Figure 3:
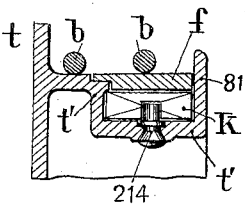

The arrangement of the loose pulley and of the fixed pulley may be as shown in Fig. 3, which shows a ring $t'$ arranged on the pulley $t$, a loose pulley $f$ which may for instance be located in a recess of the fixed pulley $t'$ and be maintained by a flange 81 and carried around with the pulley $t$ in the movement of rotation of said pulley $t$ by means of the centrifugal masses $k$ which are allowed to displace themselves radially, or, if preferred, being rendered solid in the direction of the rotation by means of a stud 214.

It will be seen from Figure 3 that it is possible to vary the surface of the loose pulley $f$ relatively to that of the fixed pulley $t'$, and, consequently the ratio of power which it is possible to give at low speeds. According to the weight of the vehicle for instance, the fixed pulley $t'$ will be larger and the loose pulley $f$ will be smaller.

If, then it is desired to provide the possibility of wedging the wheels, the said loose pulley could even be omitted, and the fixed pulley $t'$ would be alone, in that particular case, arranged for the control of the brakes. That arrangement, however is not to be commended for the public security.

What I claim is:

1. In a braking device for motor and other vehicles, a shaft, a casing, a plurality of fixed and loose pulleys in the casing, means for causing a loose pulley to turn with the shaft, a pivoted arm, means for swinging the arm, a pulley carried by the arm, a belt passing around the fixed and loose pulleys and the pulley of the arm, a brake controlling lever, and means on the belt adapted to engage said lever.

2. In a braking device for motor and other vehicles, a shaft, fixed and loose pulleys carried by the shaft, means for causing a loose pulley to turn with the fixed pulley, a pivoted arm, a pulley carried by the arm, means for swinging the arm, a belt passing around said pulleys, a pivoted brake controlling lever, and projections on the runs of the belt for alternately engaging the lever.

3. In a braking device for motor and other vehicles, an axle, a casing mounted on the axle, fixed and movable pulleys in the casing, centrifugal means for causing a loose pulley to turn with the fixed pulley, a pivoted arm, a pulley carried by the arm, fluid pressure means for swinging the said arm, a pivoted brake controlling lever, an endless belt passing around the said pulleys, and projections on the belt for alternately engaging the lever.

4. In a braking device for motor and other vehicles, an axle, a casing mounted on the axle, fixed and loose pulleys in the casing, centrifugal means for causing a loose pulley to turn with fixed pulley, a pivoted arm, a pulley in the end of the arm, a cylinder, a piston in the cylinder and pivotally connected with the arm, a pivoted brake controlling lever, an endless belt crossed and passing around said pulleys, and projections on the runs of the belt for alternately engaging said lever.

In testimony I have hereunto set my hand at Paris, France, this 2nd day of February, 1923.

PAUL HALLOT.